United States Patent [19]
Tan

[11] Patent Number: 5,941,582
[45] Date of Patent: Aug. 24, 1999

[54] VEHICLE BUMPERS INCORPORATING HYDRAULIC MEANS

[76] Inventor: Tah Hee Tan, 65, Leboh Tamarind Off Teluk Gadung Road, Southern Park, Klang, Selangor Darul Ehsan, Malaysia, 42100

[21] Appl. No.: 09/077,388

[22] PCT Filed: Nov. 25, 1996

[86] PCT No.: PCT/AU96/00754

§ 371 Date: Sep. 3, 1998

§ 102(e) Date: Sep. 3, 1998

[87] PCT Pub. No.: WO97/19834

PCT Pub. Date: Jun. 5, 1997

[30] Foreign Application Priority Data

Nov. 28, 1995 [MY] Malaysia ............... PI 9503635

[51] Int. Cl.[6] .................................................. B60R 19/26
[52] U.S. Cl. .................. 293/132; 293/134; 293/135; 293/136; 293/137; 267/139; 267/33
[58] Field of Search .................... 293/132, 134, 293/135, 136, 137; 267/139, 33

[56] References Cited

U.S. PATENT DOCUMENTS

| | | | |
|---|---|---|---|
| 2,977,146 | 3/1961 | Edwards et al. ............... | 267/139 |
| 3,203,722 | 8/1965 | Zahorodny ....................... | 293/137 |
| 3,376,795 | 4/1968 | Allen .............................. | 267/33 |
| 3,623,760 | 11/1971 | Beswick .......................... | 293/137 |
| 3,920,274 | 11/1975 | Fannin ............................ | 267/139 |
| 3,933,344 | 1/1976 | Taylor ............................. | 293/134 |
| 3,960,397 | 6/1976 | Janci . | |
| 3,968,862 | 7/1976 | Gorges et al. ................... | 267/139 |
| 4,426,109 | 1/1984 | Fike, Jr. .......................... | 267/139 |
| 4,889,374 | 12/1989 | Choun ............................ | 293/132 |
| 5,029,919 | 7/1991 | Bauer . | |
| 5,139,297 | 8/1992 | Carpenter et al. .............. | 293/136 |
| 5,181,589 | 1/1993 | Siegner et al. ................. | 293/136 |
| 5,242,157 | 9/1993 | Boneberger et al. ........... | 293/134 |

FOREIGN PATENT DOCUMENTS

| | | |
|---|---|---|
| 1416384 | 9/1964 | France . |
| 2671316 | 7/1992 | France . |
| 3843615 | 7/1990 | Germany . |
| 4026479 | 3/1991 | Germany . |
| 06298019 | 10/1994 | Japan . |
| 2195586 | 4/1988 | United Kingdom . |

*Primary Examiner*—Joseph D. Pape
*Assistant Examiner*—Kiran Patel
*Attorney, Agent, or Firm*—Antonelli, Terry, Stout & Kraus, LLP

[57] ABSTRACT

A bumper device for motor vehicle is disclosed. A series of impact absorbing means to reduce the force of impact from collision that is transmitted onto the chassis of a vehicle is disclosed. The impact absorbing means includes: a hydraulic cylinder and piston means, an impact receiving means, a liaising and resilient body means. The impact receiving means includes a pneumatic tubular body secured to it to be the contact body on collision.

12 Claims, 2 Drawing Sheets

VEHICLE BUMPERS INCORPORATING HYDRAULIC MEANS

The present invention relates to a vehicle bumper and in particular relates to a vehicle bumper incorporating hydraulic means. The invention also relates to a vehicle bumper incorporating hydraulic means and air cushion means.

The use of bumpers at the front and back of motor vehicles to prevent serious damage to the vehicle is well known. Most bumpers include a horizontal bar fixed across the front or back of the vehicle to reduce damage in a collision. These bars are fixed onto the vehicle framework or chassis. The horizontal bar consists of a metal bar with or without plastics material secured to it. Usually a trimming of rubber is secured to the outer side of the bars. In recent times the bar is enclosed in solid polyurethane foam or other similar rigid shock absorbent plastics material. Decorative surface coatings may optionally be provided.

In the prior art, the structure of the bumpers are not designed or constructed to withstand heavy impact on collision. Usually in such situations, serious damage is caused to the vehicles and misalignment of the base framework of the vehicle occurs.

Thus it is an object of the present invention to provide a bumper for a motor vehicle which is configured to and constructed to withstand substantial impact force exerted on the vehicle either at the front or back of the vehicle or from both directions.

The invention discloses a bumper device for a motor vehicle to reduce the damage of the force of impact on collision with a foreign body comprising of an impact receiving means, at least one hydraulic piston and cylinder means to receive the force of impact; at least one biasing means to receive the impact force from the hydraulic piston and cylinder means, said biasing means secured to the vehicle chassis frame body. The force of impact of collision with a foreign body is received by the impact receiving means and transmitted onto the hydraulic piston and cylinder means and the resultant impact force is transmitted onto the biasing means and on to the chassis frame body. The impact receiving means comprises of an anchorage frame with a channel and a tubular pneumatic balloon.

The hydraulic piston and cylinder means comprises of a first cylinder portion, a second fructo conical cylinder portion: and a third cylindrical portion, all three portion being connected linearly. The cross-sectional diameter of the first portion being substantially larger than the cross-sectional diameter of the third portion, and a first piston head and shaft engaged in the first cylinder portion and a second piston and rod in the third cylinder portion.

The hydraulic cylinder contains a pre-determined ratio of hydraulic liquid and air or other gaseous material.

The bumper means as described above consists of single stage hydraulic cylinder and piston means. In another aspect, the invention also includes a bumper device where a plurality of hydraulic cylinder and piston means are provided. These hydraulic cylinder and piston means can be arranged in series or in parallel or a combination thereof, i.e., the reduction of the impact force by the hydraulic cylinder and piston means is done by stages, if arranged in series, or simultaneously if arranged in parallel.

Figure 1:
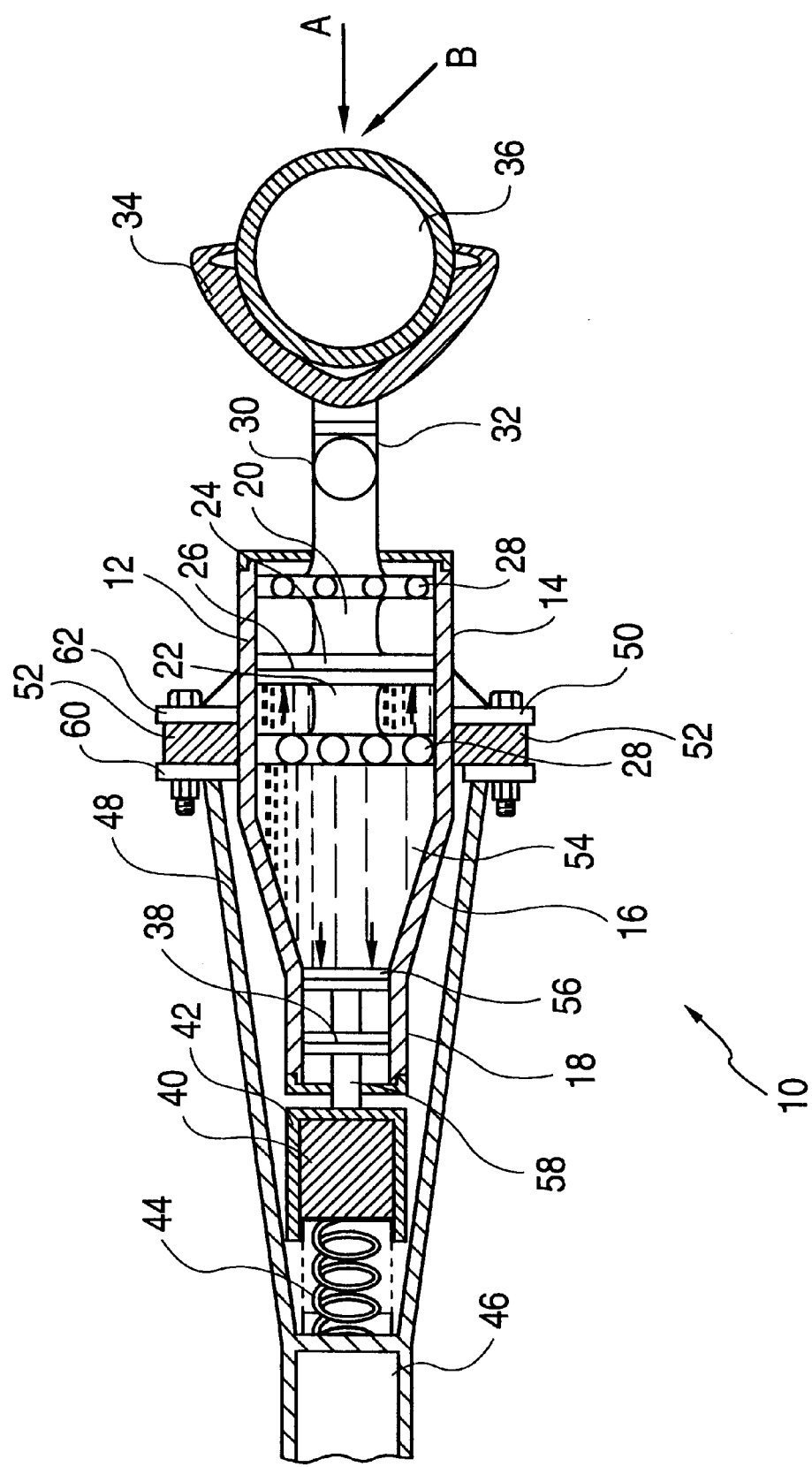
FIG. 1 shows a cross-sectional view of the bumper assembly in isolation.

Referring to FIG. 1 there is shown a bumper unit (10) which includes a hydraulic cylinder (12) comprising of three portions. The first portion (14) is an elongated tubular cylinder and the third portion (18) is an elongated tubular cylinder whose cross-sectional diameter is smaller than the cross-sectional diameter of the first cylinder portion (14). The first and the second cylinder portions are sealingly connected by a fructo conical second portion (16). The first cylinder portion (14) includes a hydraulic piston (20) with the rod (22) extending beyond the piston head (24). A hydraulic seal (26) is engaged upon the piston head (24) to ensure a effective hydraulic seal when the piston is moved to and fro within the first chamber. A plurality of ball bearing rings (28) are secured to the piston shaft to minimize damage to the hydraulic cylinder in the event of an off longitudinal axis impact on the bumper. The piston shaft extending outside the hydraulic cylinder (12) is secured to a universal joint (30), which in turn is secured to a coupling shaft (32). Alternatively instead of a piston rod, a piston cylinder shaft can be provided.

The coupling shaft (32) is secured to a tire anchoring frame (34). The tire anchoring frame (34) is an elongated bar configured to embrace the back or front side of the motor vehicle and is U or V shaped in cross-section. The invention includes a pneumatic tubular flexible balloon-like structure (36) housed within the tire anchoring frame (34). The balloon is designed and configured to withstand substantial impact and rough handling without being punctured or deformed. The exposed side of the balloon (36) extends beyond the limbs of the tire anchoring frame (34) and wraps around the corners of the tire anchoring frame at the corners of the motor vehicle. The balloon can also advantageously be oval in shape to provide a more appealing aesthetic appearance.

Alternatively the coupling shaft (32) is secured to conventional bumpers by means known to the art.

The third cylinder portion (18) includes a double headed piston rod (58) with the rod extending outside the cylinder portion (18). A first cylinder head (56) and a second cylinder head (38) is attached to the piston rod (58). The cylinder heads includes hydraulic seals to provide effective hydraulic seal. The piston rod (58) is secured to a resilient body, such as a block of rubber (40) or a pneumatic rubber body. To provide better securing of the rubber body to the piston rod, a housing chamber (42) is secured to the piston rod (58) and the resilient body (40) is then contained within the housing chamber (42).

A biasing means, preferably a helical spring (44) is secured to the rubber body and a receptacle (46) in the base frame of the vehicle body.

To minimize damage to the vehicle in the event of an off the longitudinal axis impact, the hydraulic cylinder (12) is further secured to the vehicle chassis frame by a conical frame body (48). The conical frame body (48) is secured to a tubular anchoring frame (50) surrounding the first portion (14) of the hydraulic cylinder (12). Shock absorbent resilient body, (52) eg. rubber body is placed between the conical frame body (48) and the anchoring frame (50).

The tubular anchoring frame (50) comprises of two annular rings (60, 62) encircling the first portion of the hydraulic cylinder (14). The annular ring (62) proximate to the tire anchoring frame (34) is secured to the hydraulic cylinder body. The annular ring (60) proximate to the helical spring (44) is not secured to the hydraulic cylinder but is secured to the conical frame body (48). Between these two annular rings, is placed to resilient rubber body (52) which can be solid or pneumatic. The two annular rings (60, 62) are secured together by any conventional means, such as nut and bolt means.

The hydraulic cylinder (12) includes hydraulic liquid (54) or other suitable liquid and a predetermined quantity of air.

The workings of the invention and details of other features will now be described. In embodiments where the bumper does not include the tire anchoring frame (34) and the tire balloon (36), the bumper device is secured to the chassis frame at one end and the coupling shaft (32) is secured to the conventional number frame unit. In the event of impact on the bumper along the longitudinal axis (A) the impact force is transmitted along the coupling shaft (32), universal joint (30) and the hydraulic piston (20). The piston head (24) acts on the mixture of hydraulic liquid (54) and air. The total force acting on the smaller piston head (56) is proportionate to surface area of this piston head to the surface area of the larger piston head (24). Thus a smaller impact force is transmitted onto the smaller piston head. This impact force is transmitted onto the rubber body (40) and the helical spring (44). A large amount of the impact force transmitted by the smaller piston (58) is absorbed by the rubber body and the helical spring, as a result only a small amount of the original amount of impact force encountered on the coupling shaft (32) by the conventional bumper unit is transmitted to the vehicle chassis (46).

After the absorption of the impact force by the chassis frame (46) the helical spring (44) extends to its equilibrium position, simultaneously pushing back the small piston (58). The large piston (20) is pushed back to its original equilibrium position by expansion of the compressed gaseous material within the hydraulic chamber.

In an alternate embodiment, the conventional bumper bar is replaced by the tire anchoring frame and tire balloon (36). Any collision impact is initially exerted on the tire balloon, which absorbs a substantial amount of impact force. As compared to the earlier embodiment, it will be appreciated that for a given amount of impact force, a lesser amount of force is finally transmitted to the chassis frame (46).

In the event the impact force, is applied off the longitudinal axis (A) such as direction (B), the resultant lateral impact force is partially absorbed by resilient rubber body (52). The union joint (30) ensures that said impact force is transmitted onto the piston rod. The resilient rubber body (52) absorbs part of the lateral force exerted by the piston rod and head onto the hydraulic cylinder wall. The mounting of the piston shaft (22) within two ball bearing rings (28) ensures that the shaft (22) is not easily deformed by an off the longitudinal axis impact. Other means of securing the piston shaft within the hydraulic cylinder, such as tubular rings secured to the chamber of hydraulic chamber, can be provided.

Figure 2:
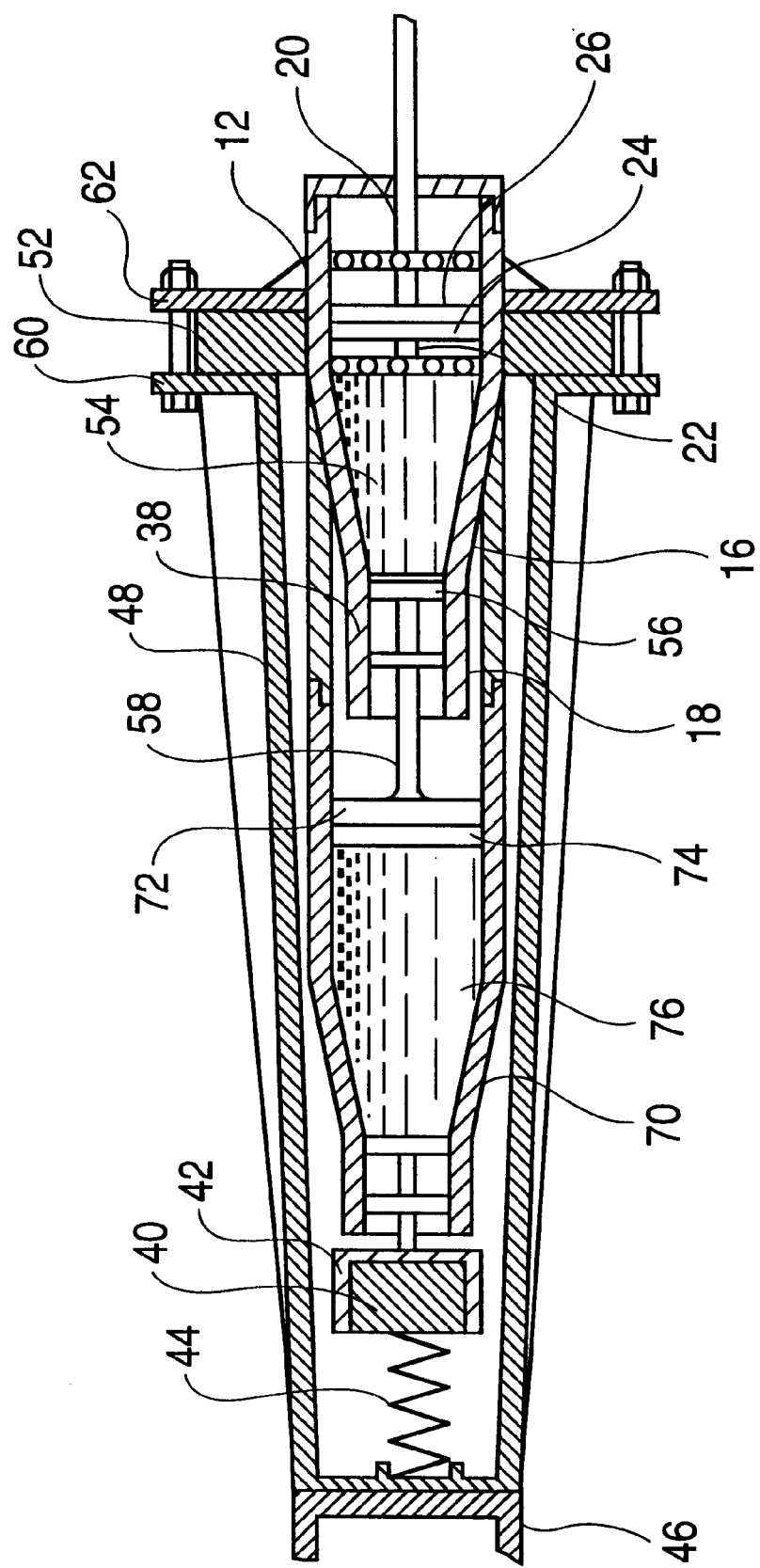
FIG. 2 shows a cross-sectional view of another embodiment of a bumper assembly.

FIG. 2 shows a cross sectional view of another embodiment of a bumper assembly. A second hydraulic means (70) is placed between the first hydraulic means as described earlier (see FIG. 1) and the rubber body (40). This hydraulic means would be contained with the conical frame body (48). The end of the piston rod (58) in the first hydraulic means is secured to a piston head (72) which moves along the chamber of the second hydraulic means (70). The chamber (76) of the second hydraulic means contains a predetermined ratio of hydraulic fluid and air or other gaseous matter Gust like in the chamber of the first hydraulic means). The piston head (72) includes a hydraulic seal ring (74) to prevent leakage.

The alterations in the working of this embodiment will now be described. The impact force acting on the piston rod (58) is transmitted into the second hydraulic means (70). The piston head (72) acts on the mixture of hydraulic fluid and air (76). As the air in this chamber is compressed, a smaller impact force is transmitted onto the rubber body (40) and the helical spring (44). Thus it will be seen that the original impact force resulting from collision of the vehicle with another body is reduced in stages before any force is exerted onto the vehicle chassis body.

The inventive concept of this invention can be adopted to construct bumper means incorporating more than two hydraulic means. The appropriate number of hydraulic means to be adopted would depend on the reduction ratio between the initial force of impact from collision and the final force that can be safely absorbed by the vehicle chassis body without damage being caused to the said chassis body.

I claim:

1. A bumper device for a motor vehicle to reduce the damage of the force of impact on collision with a foreign body including;

at least one impact receiving means consisting of an anchorage frame with a channel to receive a tubular resilient member which is oval in cross-section and is encapsulating on at least one side of the anchorage frame;

at least one hydraulic piston and cylinder means consisting of a first cylinder portion, a second frusto cylinder portion and a third cylindrical portion, all three portions being connected linearly, the cross-sectional diameter of the first portion being substantially larger than the cross-sectional diameter of the third portion and a first piston head and rod engaged in the first cylinder portion and a second piston head and rod engaged in the third cylinder portion; and at least one biasing means to receive the impact force from the second piston head and rod, wherein the force of impact of collision with a foreign body is received by the impact receiving means and transmitted onto the hydraulic piston and cylinder means and the resultant impact force is transmitted onto the biasing means and onto the chassis frame body and the biasing means is secured to a vehicle chassis frame body.

2. The bumper device for a motor vehicle to reduce the damage of the force of impact on collision with a foreign body comprising of:

an impact receiving means consisting of an anchorage frame with a channel to receive a tubular resilient member which is oval in cross-section and is encapsulating on one side of the anchorage frame;

a first hydraulic piston and cylinder means consisting of a first cylinder portion, a second frusto conical cylinder portion and a third cylindrical portion all three portions being connected linearly, the cross-sectional diameter of the first portion being substantially larger than the cross-sectional diameter of the third portion, a first piston head and rod engaged in the first cylinder portion, and a second piston head and road engaged in the third cylinder portion;

a second hydraulic piston and cylinder means, consisting of a first cylinder portion having one end sealingly concentrically connected to the first hydraulic piston and cylinder means and a second frusto conical portion and a third cylinder portion wherein the piston rod engaged in the third cylinder portion of the first hydraulic piston and cylinder means, connected to a piston head; a third piston head and rod engaged in the third cylinder portion; and one biasing means to receive the impact force from the third piston rod, said biasing means secured to the vehicle chassis frame body wherein the force of impact of collision with a foreign body is received by the impact receiving means and transmitted sequentially onto the hydraulic piston and cylinder means to a second hydraulic piston and cylinder means to the third piston and cylinder, onto the biasing means and onto the chassis frame body.

3. The bumper device as claimed in claim 1 wherein the first cylinder portion includes a means to maintain a first piston shaft in longitudinal axis position in the event of an off-longitudinal axis impact on the said first piston shaft.

4. The bumper device as claimed in claim 3, wherein: the means to maintain the first piston shaft in position includes a pair of spaced apart ball bearing rings which accommodate the piston shaft and an extended piston shaft.

5. The bumper device as claimed in claim 1 wherein: the hydraulic piston and cylinder means contains predetermined ratios of hydraulic liquid and air.

6. The bumper device as claimed in claim 1 wherein: a resilient body is positioned between the biasing means and the second piston means.

7. The bumper device as claimed in claim 2 wherein: a resilient body is positioned between the biasing means and the third piston means.

8. The bumper device as claimed in claim 1 wherein: the hydraulic piston and cylinder means is attached to the vehicle chassis by a resilient rubber body and a support frame body.

9. The bumper device as claimed in claim 6 wherein: the resilient rubber body is a tubular body surrounding the hydraulic piston and cylinder means and is attached to a tubular flange secured to the circumferential surface of the hydraulic pneumatic piston and cylinder means.

10. The bumper claim as claimed in claim 1 wherein: the hydraulic piston and cylinder means is connected to the impact receiving means by a union join means.

11. The bumper device as claimed in claim 1 wherein: the bumper device includes a plurality of hydraulic cylinder and piston means arranged in series wherein the reduction of impact force by the hydraulic cylinder and piston means is in stages.

12. The bumper device as claimed in claim 1 wherein: the bumper device includes a plurality of hydraulic cylinder and piston means arranged in parallel wherein the reduction of impact force by the hydraulic cylinder and piston means is effected simultaneously.

* * * * *